United States Patent [19]
Noble et al.

[11] Patent Number: 5,820,914
[45] Date of Patent: Oct. 13, 1998

[54] PROCESSING OF SOLUBLE TEA SOLIDS

[75] Inventors: Ian Noble, Northampton; Jeffrey Bryn Richards, Northants, both of United Kingdom

[73] Assignee: Lipton, Division of Conapco, Inc., Englewood Cliffs, N.J.

[21] Appl. No.: 861,376

[22] Filed: May 21, 1997

[30] Foreign Application Priority Data

Jun. 3, 1996 [EP] European Pat. Off. .............. 96304016

[51] Int. Cl.⁶ ...................................................... A23F 3/00
[52] U.S. Cl. .......................... 426/597; 426/263; 426/471; 426/495
[58] Field of Search .................................... 426/597, 471, 426/495, 263

[56] References Cited

U.S. PATENT DOCUMENTS

| | | |
|---|---|---|
| 3,445,236 | 5/1969 | Gurkin . |
| 3,484,246 | 12/1969 | Moore, Jr. . |
| 3,484,247 | 12/1969 | Grahm . |
| 3,787,590 | 1/1974 | Borders . |
| 4,156,024 | 5/1979 | Husaini . |

FOREIGN PATENT DOCUMENTS

| | | |
|---|---|---|
| 1311255 | 5/1971 | United Kingdom . |
| 1461726 | 6/1975 | United Kingdom . |

OTHER PUBLICATIONS

Derwent Abstract of SU–A–262,758.
N.D. Pintauro in "Tea and Soluble Tea Products Manufacture" (1977 Noyes Data Corporation,USA), p.96 —as specified at p. 2 of the specification.

*Primary Examiner*—Anthony J. Weier
*Attorney, Agent, or Firm*—James J. Farrell

[57] ABSTRACT

This invention concerns a method of altering the colour characteristics of a tea composition, including treating a tea infusion that contains cold water soluble tea solids but is substantially free of cold water insoluble tea solids, with an oxidising agent in a reaction vessel at a temperature and pressure in excess of the ambient temperature and pressure.

16 Claims, No Drawings

PROCESSING OF SOLUBLE TEA SOLIDS

FIELD OF THE INVENTION

The invention relates to a method of treating cold water soluble solids derived from tea leaves.

BACKGROUND OF THE INVENTION

When hot aqueous infusions of black leaf tea are prepared, it is found that the infusion comprises substances which are insoluble in cold water, which substances therefore tend to precipitate as the infusion cools. These cold water insoluble substances comprise tannin complexes (known as tea "cream"), and typically comprise 15–35% of the total tea solids present in the infusion.

Black leaf tea infusions may be used to produce "instant" teas and other products which are preferably soluble in cold water. For this reason, it is known to separate the insoluble tea cream from the "decreamed" fraction (which is the term given to the cold water soluble materials after removal of the cold water insoluble cream). This is typically accomplished by centrifugation of the chilled (3°–10° C.) extract. The insoluble cream fraction represents a significant proportion of the tea solids in the infusion. Accordingly, to prevent the cream fraction (which contains desirable flavour components) going to waste, it is known to treat the cream fraction, in one of a number of ways, so as to render it soluble in cold water and then to recombine the solubilised cream with the decreamed fraction. Various treatments of the cream fraction of tea infusions are described, for example, in GB 1,311,255, GB 1,461,726, U.S. Pat. No. 3,787,590 and U.S. Pat. No. 4,156,024. In particular, U.S. Pat. No. 3,787,590 discloses a method of solubilising tea cream, the method comprising oxidation of the cream using hydrogen peroxide ($H_2O_2$) in an autoclave at 240° F. (115.6° C.) at 50 pounds per square inch (0.35 MPa), at a pH of 3.2.

Further discussion is provided by N. D. Pintauro in "Tea and Soluble Tea Products Manufacture" (1977 Noyes Data Corporation, USA). For example, at page 96 is disclosed a "batch reactor method" for solubilising cold water insoluble tea tannins, the method comprising treatment with pressurised oxygen (2.1 to 14 $kg/cm^2$, equivalent to 0.2–1.35 MPa) at a temperature of 71° to 107° C. and at a pH in the range 5.5 to 7.5. Again, these conditions are not sufficient to significantly increase the solubility of oxygen in the aqueous mixture, and the use of higher pressures is generally to be avoided because of the cost of creating and maintaining the necessary pressure. Additionally, in the method disclosed by Pintauro, bleaching with hydrogen peroxide is taught to reduce the amount of colour formation.

In contrast to the foregoing, very little is known about oxidation of the decreamed fraction of tea infusions, which contains the cold water soluble components. As the constituents of the decreamed tea are already soluble, there has been no motivation whatsoever to apply to decreamed tea those processes applied to the cream fraction for the purpose of solubilising cold water insoluble materials.

It is an object of the present invention to provide a process, applicable to the decreamed fraction of a tea infusion, which serves to improve the colour characteristics of the mixture.

SUMMARY OF THE INVENTION

In a first aspect the invention provides a method of altering the colour characteristics of a tea composition, comprising treating an aqueous mixture comprising cold water soluble tea solids and substantially free of cold water insoluble tea solids, with an oxidising agent in a reaction vessel at a temperature and pressure in excess of the ambient temperature and pressure.

The term "cold water soluble tea solids" as used herein is intended to refer to substances present in a hot water infusion prepared from tea leaves, which substances remain soluble when the infusion is chilled to 3°–10° C. In contrast, "cold water insoluble tea solids" is intended to refer to substances present in a hot water infusion prepared from tea leaves, which generally precipitate when the infusion is chilled to 3°–10° C.

Typically the aqueous mixture comprising cold water soluble tea solids will be derived or formed from the decreamed fraction of an aqueous tea infusion.

Preferably the method of the invention will be applied in such conditions of temperature and pressure that distilled water would have a maximum capacity for dissolved oxygen, at equilibrium, of at least 0.5 grams/liter. The maximum obtainable solubility of dissolved oxygen in distilled water under given conditions of temperature and pressure can be readily determined by reference to standard texts. Thus Perry's Chemical Engineering Handbook (Perry & Green 1984, Sixth Edition p.3 103, McGraw Hill) gives the values for maximum solubility of oxygen in water at elevated pressure for temperatures up to 100° C. For temperautures in excess of 100° C., reference may be made to the paper by Pray et al., (1952 Industrial and Engineering Chemistry 44, 1146–1151). The maximum dissolved oxygen concentration obtainable at equilibrium under the same conditions in aqueous mixtures comprising cold water soluble tea solids (such as are the subject of the process of the present invention) may vary somewhat from those values obtainable in distilled water. In particular the presence of other solutes in the aqueous phase, competing with oxygen molecules for hydration by water molecules, will tend to decrease the solubility of oxygen in the aqueous phase. However this is unlikely to cause a large reduction in oxygen solubility in the conditions of interest. The actual concentration of dissolved oxygen in the aqueous mixture cannot readily be determined—under the typical conditions of the process, standard methods of determining oxygen concentration (e.g. by the use of an oxygen electrode) are not feasible.

The conditions employed in the method defined above are generally more extreme than those conventionally applied in the prior art to the processing of aqueous mixtures of cold water insoluble tea solids and result in a far greater maximum obtainable dissolved oxygen concentration. In general those skillled in the art would be motivated to avoid such conditions because of the energy costs in achieving the same.

However, the present inventors have found that such processing has a highly desirable effect on the colour of mixture, which becomes much darker (i.e. less luminous) and more highly red coloured, than mixtures which have not undergone the process of the invention. The invention cannot be considered obvious because, as stated above, one skilled in the art would have no motivation to apply such a process to cold water soluble solids. In addition, the chemical composition of cold water soluble solids is very different to that of cold water insoluble solids, such that similar treatment of the two materials would not necessarily be expected to produce the same results.

The preferred oxidant is oxygen. Use of high partial pressures of oxygen serves to increase the maximum capacity of the aqueous mixture for dissolved oxygen. Preferably conditions are such as to create a maximum capacity for dissolved oxygen (in distilled water) at equilibrium in the range of 0.5 to 5 grams per liter, more preferably 0.5 to 1.5 grams per liter, and most preferably 0.7 to 1.0 grams per liter.

Preferably conditions are arranged (e.g. by the use of high partial pressures of oxygen and by the use of agitation) such that the actual concentration of dissolved oxygen in the aqueous mixture approaches the maximum obtainable at equilibrium under the selected conditions. However, it is quite possible that the system never attains equilibrium (e.g. because dissolved oxygen is consumed in oxidation reactions), such that the maximum obtainable equilibrium concentration of dissolved oxygen in the aqueous mixture is not reached.

Those skilled in the art will appreciate that other oxygen-containing or generating substances may be used to give an equivalent oxygen solubility in the aqueous mixture. For example, a higher partial pressure of air or oxygen-enriched air may be used, or (less preferably) aqueous solutions of hydrogen peroxide may be added. Alternatively ozone, or other oxidising gas, may be used so as to give an "oxidising power" in the aqueous mixture equivalent to that generated by a maximum oxygen solubility of at least 0.5 grams per liter.

The temperature at which the method is performed is generally in the range 60°–160° C. and preferably above 100° C., conveniently in the range 100° to 140° C., preferably in the range 100° to 120° C., typically 116° to 120° C.

It will be apparent from the foregoing, and those skilled in the art will appreciate, that increased temperature in a closed reaction system will increase pressure, and so tend to increase the amount of oxygen dissolving in the aqueous mixture. Under certain circumstances, it may be preferred to use an "open" system, whereby the concentration of a gaseous oxidising agent is held constant, whilst being passed through the reaction vessel at a given flow rate. Alternatively, the gaseous oxidising agent may be advantageously introduced in pulses.

The reaction may be performed as a batch process (where the reaction vessel may be, for example, a stirred tank) or may be a continuous process (performed, for example, in a stirred tank or a conduit, such as a pipe).

The method of the invention may successfully be performed on aqueous mixtures comprising suspensions of cold water soluble tea solids in the range 0.3–20.0% (w/v). Conveniently a concentration in the range 3–10% (w/v) may be selected, which gives a reasonable amount of tea solids without making the solution unmanageably viscous.

Conveniently the process is performed at a pressure in the range 0.11 to 4.0 MPa gauge, preferably 0.2 to 3.5 MPa gauge, and more preferably 0.3 to 3.0 MPa gauge.

Generally, the prior art teaches that oxidation of tea cream is performed at alkaline pH. In contrast, the process of the present invention may be performed at the natural (acidic) pH of the cold water soluble tea solids composition, although the pH of the composition may be varied, if desired, without adverse effect.

The time taken to complete the reaction will of course depend in part on the reaction conditions used. Typically, the reaction will take between 10 minutes and 1 hour, more normally 10–30 minutes. The reaction time may be shortened by the incorporation of other oxidising agents (e.g. ozone, $H_2O_2$) into the aqueous mixture, either in a single batch or incrementally.

Conveniently the cold water soluble solids treated in accordance with the present invention may be combined with solubilised tea cream. The resulting solution may optionally be concentrated and dried, typically by spray drying, to give a cold water soluble powder, which may be the basis of an instant tea powder.

In the examples that follow, a 3% (w/v) suspension of tea solids was prepared in deionised water, starting from a freeze-dried powder prepared from an aqueous tea extract from which the cold water insoluble tea solids had been removed. This arrangement allowed for optimum reproducibility of experimental conditions and had the advantage of simplicity. In practice, on an industrial scale, it is envisaged that the aqueous mixture used in the process of the invention will be an aqueous decreamed tea extract, without having gone through an initial freeze-drying stage. The aqueous decreamed extract may conveniently be concentrated prior to processing according to the method of the invention. The examples below further illustrate the nature of the present invention.

EXAMPLES

Method:

A decreamed tea extract was prepared from a black tea in the following manner. Deionised water and black tea, at a water to leaf ratio of 10:1, were contacted in a 7 stage countercurrent continuous extractor, wherein the black tea had a residence time of approximately 10 minutes and the deionised water had a residence time of approximately 15 minutes. The extraction was carried out at 85° C. (The deionised water extract of tea solids is referred to as an infusion of tea solids.) The infusion was then chilled to 5° C. to precipitate the cold water insoluble tea solids, which were removed by centrifugation. The supernatant was freeze dried, to give a powder which can be used as a source of cold water soluble tea solids.

The powder described above was used to prepare an aqueous solution containing 3% (w/v) of decreamed black tea solids. The solution was added to a Parr bench top mini reactor model number 4562, which is capable of operating safely under high pressures and of maintaining a desired temperature. The solution of tea solids was then placed into the Parr reactor, the reactor sealed and the vessel was pressurized to between 1.9 and 2.2MPa gauge with oxygen. The vessel was then heated to the required temperature between 70° C. and 120° C. using an electric mantle heater. As a result of heating, the oxygen partial pressure within the reactor increased to between 2.1 and 2.7 MPa gauge at the reaction temperature, so as to obtain a constant maximum oxygen solubility of 0.7 grams/liter at the different reaction temperatures. The reaction was allowed to proceed for 15 to 30 minutes, after which time the reactor was cooled to between 80° C. and 90° C., the pressure within the reactor was released and the solution of tea solids collected.

The resulting treated cold water soluble tea solids were then dried, giving a powder which was instantly soluble in water and was found to have the organoleptic properties desirable for an instant tea powder for use in beverages with an acidic pH.

The colour assessment of the supernatant from the centrifugation process was made using a Minolta CT-310 instrument using illuminant C, a 2° observer, a 1 cm pathlength transmission cell and the results are based on the CIE 1976 L*a*b colour space (see International Standards Organisation [ISO] standards 7724-1, 7724-2 and 7724-3). All samples for colour analysis were measured at pH 3.7 and a solids concentration of 0.32% (w/v). The results for reactions performed at three different temperatures are shown in Table 1.

Those skilled in the art will appreciate that the absolute pressure used in a given system will depend on the oxidising power of the gaseous oxidising agent used. Where the oxidising agent is used as a source of oxygen, this will depend on the partial pressure of oxygen in the gas. For example, to achieve a maximum oxygen solubility of 0.7 g/l in the system detailed here requires: oxygen gas at partial pressures of 1.9 to 2.8 MPa gauge, whilst use of air would require partial pressures of 9.5 to 14.0 MPa gauge.

TABLE 1

The effect of heating a black tea infusion of 3% (w/v) solids in the presence or absence of an increased maximum oxygen solubility at the native pH, on the measured colour properties at pH 3.7 and 0.32% (w/v).

| Temp (°C.) | Maximum Dissolved oxygen concentration $(g \cdot l^{-1})$* | L | a | b |
| --- | --- | --- | --- | --- |
| 70 | 0.7 | 76.7 | 7.5 | 65.7 |
| 100 | 0.7 | 70.4 | 11.9 | 66.0 |
| 120 | 0.7 | 61.7 | 20.2 | 68.9 |

*Theoretical determination based on data from Perry's Chemical Engineering Handbook (R. H. Perry & D. Green, p 3. 103, 1984 sixth edition, McGraw Hill).

We claim:

1. A method of altering colour characteristics of a tea composition, comprising the steps of treating a tea infusion that contains cold water soluble tea solids but is substantially free of cold water insoluble tea solids, with an oxidising agent in a reaction vessel at a temperature and pressure in excess of ambient temperature and pressure.

2. A method according to claim 1, wherein the tea infusion is decreamed prior to said treatment with said oxidizing agent.

3. A method according to claim 1, wherein said temperature and pressure are those at which distilled water, would have at equilibrium a maximum capacity for dissolved oxygen of at least 0.5 grams/liter.

4. A method according to claim 1, wherein said temperature and pressure are those at which distilled water, would have at equilibrium a maximum capacity for dissolved oxygen in the range 0.5–5.0 grams/liter.

5. A method according to claim 1, wherein said temperature and pressure, are those at which distilled water would have at equilibrium a maximum capacity for dissolved oxygen in the range 0.7–1.0 grams/liter.

6. A method according to claim 1, wherein the process is performed at a temperature in the range 60°–160° C.

7. A method according to claim 1, wherein the process is performed at a temperature in the range 100°–120° C.

8. A method according to claim 1, wherein the process is performed at a temperature in the range 116°–120° C.

9. A method according to claim 1, wherein the oxidising agent is oxygen, air, oxygen-enriched air, or ozone.

10. A method according to claim 1, wherein the aqueous mixture comprises between 0.3 and 20% w/v tea solids.

11. A method according to claim 1, performed at an oxygen partial pressure in the range 0.11–4.0 MPa gauge.

12. A method according to claim 1, performed at an oxygen partial pressure in the range 0.3–3.0 MPa gauge.

13. A method of making a cold water soluble instant tea powder comprising treating a tea infusion that contains cold water soluble tea solids in accordance with claim 1 so as to form a mixture having improved colour characteristics, concentrating the mixture if desired, and drying so as to give a cold water soluble powder.

14. A method according to claim 13, wherein the drying step comprises freeze- or spray-drying.

15. A method of making a cold water soluble instant tea powder according to claim 13, comprising: separating an aqueous tea infusion into cream and decreamed fractions, treating the cream fraction so as to solubilise a substantial portion thereof and retaining the solubilised portion; treating the decreamed fraction with an oxidizing agent in a reaction vessel at a temperature and pressure in excess of ambient temperature and pressure; combining the treated decreamed fraction and the solubilised portion of the cream fraction to give a combined solution of cold water soluble solids; concentrating the combined solution if desired, and drying to give a soluble powder.

16. A method according to claim 15, wherein the drying step comprises freeze- or spray-drying.

* * * * *